June 24, 1930.　　　　J. INSUL　　　　1,767,761
VEHICLE BRAKE
Filed March 28, 1929　　　2 Sheets-Sheet 2

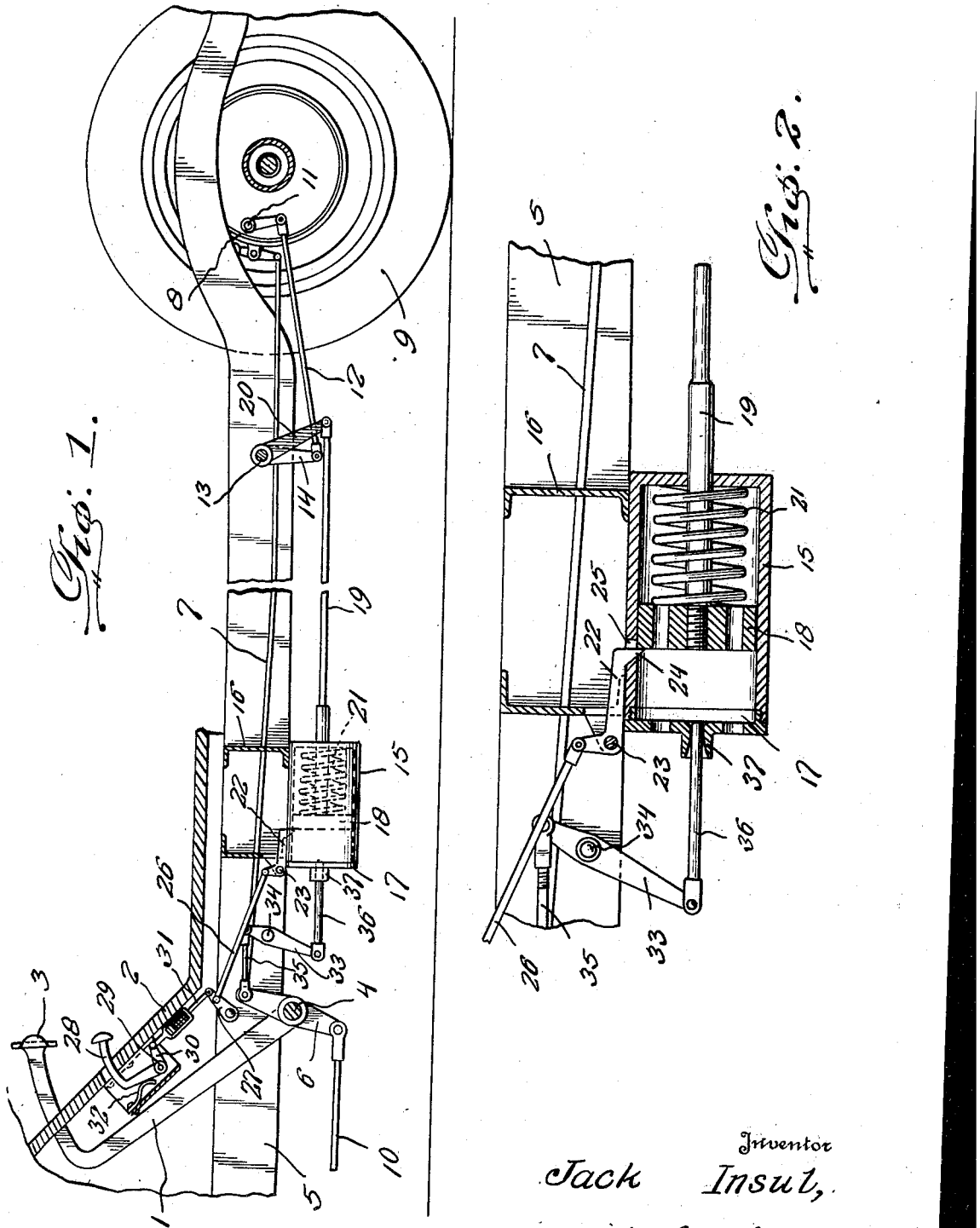

Inventor
Jack Insul,
By J. Stanley Burch
Attorney

Patented June 24, 1930

1,767,761

UNITED STATES PATENT OFFICE

JACK INSUL, OF CHICAGO, ILLINOIS

VEHICLE BRAKE

Application filed March 28, 1929. Serial No. 350,612.

The present invention relates to improvements in automobile brakes and has for its principal object to provide means for applying the emergency brake when it is desired to park the automobile, means being associated with the foot brake pedal for releasing the parking or emergency brake.

One of the important objects of the present invention is to provide a vehicle brake structure that includes a foot-operated member for effecting the actuation of the parking or emergency brake so that said emergency brake may be instantly applied to stop the vehicle whenever it becomes necessary, and this without necessitating the removal of the hand from the steering wheel so that the car will be maintained under complete control of the driver.

A further object is to provide a vehicle brake structure wherein the same will at all times be positive and efficient in its operation, the parts being further of such construction as to facilitate the installation thereof on an automobile without necessitating any material alterations.

A still further object is to provide a vehicle brake of the above-mentioned character which is simple in construction, inexpensive, strong and durable and further well adapted for the purposes for which it is designed.

Other objects and advantages of the invention will become apparent from the following description when taken in connection with the accompanying drawings.

In the accompanying drawings wherein like reference characters indicate corresponding parts throughout the same;

Figure 1 is a side elevation of a mechanical brake structure showing the normal position of the parts of said brake, portions of the vehicle being fragmentarily illustrated to show the relationship of the brake structure therewith.

Figure 2 is a detail view partly in elevation and partly in section of the emergency brake operating mechanism and the resetting means for the slidable piston; and Figure 3 is a view similar to Figure 1 showing the present invention as associated with an air or other fluid brake system.

In the drawings with reference more particularly to Figures 1 and 2, the numeral 1 designates the usual foot lever that extends upwardly through the floor board 2 and associated with the upper end of this foot lever is the pedal 3. The lower end of this foot lever is connected to a rock shaft 4 mounted transversely between the sides of the chassis 5 of an automobile in the conventional manner and secured on this rock shaft intermediate its ends is the lever 6.

An elongated rod 7 is connected at its forward end to the upper end of the lever 6 while the rear end of this rod is operatively connected with the service brakes 8 that are associated with the rear wheels 9 of an automobile also in the manner well known in the art.

A similar rod 10 is connected at its rear end to the lower end of the lever 6 while the forward end of this rod is operatively connected to the forward service brakes (not shown) where an automobile is equipped with four wheel brakes. This arrangement provides a means whereby both the forward and rear service brakes will be simultaneously actuated when the foot lever 1 is operated by the driver of the vehicle.

The parking or emergency brake structure that is associated with the rear wheels 9 is indicated generally at 11 and a rod 12 actuates the respective internal brake 11. The forward end of this rod is operatively connected to a rock shaft 13 through the medium of a link 14 and this rock shaft extends transversely between the sides of the chassis also in the manner well known in the art.

In lieu of the conventional hand lever and operating mechanism for the parking or emergency brakes, I have devised a foot-operated means for actuating the rock shaft 13 and the emergency brake 11 and this construction will now be specifically described.

A cylinder 15 that is openable at its forward end is arranged longitudinally beneath a supporting structure 16 that spans the sides of the chassis 5. A removable cap 17 is provided for the forward end of this cylinder.

Arranged for reciprocatory movement within the cylinder 15 is the piston 18 that is secured on the forward end of a plunger rod 19 and this rod is slidable through the rear end of the cylinder 15 and is operatively connected at its rear end with the rock shaft 13 through the medium of the link 20. An expansible coil spring 21 is arranged within the cylinder 15, the same encircling the forward end portion of the plunger rod 19 and being disposed between the rear face of the piston 18 and the rear end of the cylinder 15. This spring 21 normally urges the piston 18 forwardly in the cylinder 15.

An angular dog 22 is pivoted at its bend adjacent the top of the forward end of the cylinder 15 as at 23, the rear end of said dog terminating in a downwardly projecting tooth 24 that is operable through a slot 25 formed in the top wall of the cylinder 15 for engagement with the front face of the piston 18 whereby to hold the piston spaced from the forward end of the cylinder and to maintain the expansible coil spring 21 in a compressed condition. The means for actuating the dog 22 to disengage the same from the piston 18 whereby said spring 21 will automatically move the piston forwardly in the cylinder includes a rod 26 that is operatively connected at its rear end to the upwardly disposed forward end portion of the angular dog 22 and this rod is in turn operatively connected to the intermediate portion of a lever 27 that is pivoted at its lower end on the supporting frame. An angular foot lever 28 extends upwardly through the floor board 2 and the lower end of this foot lever is connected to a rock shaft 29 which carries the link 30 and this link is operatively connected to the upper end of the lever 27 by a spring controlled rod 31 in the manner as more clearly shown in Figure 1. A leaf spring 32 is associated with the foot lever 28 to normally secure or support the same in a raised position.

A lever 33 is pivoted intermediate its ends as at 34 at a point forwardly of the cylinder 15 and above the rock shaft 23. The upper end of this lever 33 is operatively connected with the upper end of the link 6 through the medium of the connecting rod 35 while a pin 36 is pivotally connected at its forward end to the lower end of this lever 33. This pin extends through a suitable guide sleeve 37 formed on the central portion of the cap 17, the bore of the sleeve being tapered to permit slight rocking movement of the pin 36.

The operation of the vehicle brake as above described and illustrated in Figures 1 and 2 may be briefly stated as follows. Normally the pivoted dog 22 engages with the front face of the piston 18 to hold the spring 21 under compression and the emergency or parking brakes 11 are released. When it becomes necessary to apply the emergency brake, the operator depresses the pedal on the foot lever 28 and this will result in the actuation of the various rods and interconnecting lever to operate the dog 22 whereby to swing the frame upwardly so that the tooth 24 is raised out of the slot 25 and out of the path of movement of the piston 18.

The spring 21 will then urge the piston forwardly and at the same time moving the plunger rod 19 forwardly with the result that the rock shaft 13 is operated to actuate the rod 12 and it is connected to each of the emergency brakes so that said emergency brakes are instantly applied.

In order to release the emergency or parking brakes, it is only necessary for the operator of the vehicle to depress the pedal 3 of the foot lever 1. This will result in the rock shaft 4 actuating the lever 6 to move the rod 35 forwardly whereby to operate the lever 33 and to cause the rearward sliding movement of the pin 36 into the casing or cylinder 15 until said pin has moved the piston 18 rearwardly beyond the slot 25 whereupon the dog 22 will again engage with the front face of the piston and hold the spring 21 under compression. Subsequently the foot lever 1 is released thus enabling the automobile to be driven without the brakes applied.

In Figure 3 of the drawings I have shown a modification of the invention wherein the same principle is employed in conjunction with an automobile equipped with hydraulic brakes. To this end, the cylinder 38 that is arranged longitudinally beneath the supporting structure 39 is openable at its forward end and a removable closure 40 is provided for the openable end of the casing or cylinder 38.

Operable within the cylinder 38 is the piston 41 that is carried by the forward end of the plunger rod 42 which plunger rod is slidable through the closed rear end of the cylinder for connection with the actuating mechanism for the rear emergency brakes (not shown). An expansible coil spring 43 is arranged within the cylinder 38 for disposition between the cap or closure 40 and the front face of the piston 41 for normally urging the latter rearwardly.

An air or other suitable fluid supply pipe 44 extends into the top of the rear end portion of the cylinder 38 for supplying the fluid that is used in the cylinder from any suitable source (not shown) and a turning valve plug 45 of any conventional construction is arranged in the supply pipe 44 directly above its connection with the cylinder. A bleed cock 46 extends from the bottom of the rear end portion of the cylinder.

The foot lever that controls the operation of the service brake is shown at 47 and the same is connected at its lower end to the rock shaft 48 carrying the lever 49 and the service brake valve control rods are indicated at 50 and 51 respectively and the adjacent ends of these rods are operatively connected to the upper and lower ends of the lever 49. A lever 52 is pivoted intermediate its ends as at 53 and the upper end of this lever is operatively connected to the upper end of the lever 49 for actuation therewith through the medium of the connecting rod 54. A rod 55 provides an operative connection between the lower end of the lever 52 and the turning plug of the bleed cock 46.

A lever 56 that is pivoted at its lower end is operatively connected with the turning plug of the valve 45 for actuating the same through the medium of the connecting rod 57 and this lever 56 is in turn operatively connected with the foot lever 58 that extends through the floor board 2, through the medium of the sectional spring controlled rod unit 59 and through the medium of the link 60 that has association with the rock shaft 51 on which the foot lever 58 is mounted.

In the operation of this type of brake, the foot lever 58 is actuated whereby to operate the valve 45 thus permitting air or other suitable fluid under pressure to enter the cylinder 15 and this will result in the forward movement of the piston 41 against the tension of the spring 43 to operate the emergency or parking brakes. In order to release the trapped fluid in the cylinder 38 after the emergency brakes have been applied, the foot lever 47 is operated to actuate the lever 49 and through the medium of the connecting rod 54, the lever 52 will be operated thus actuating the rod 55 to operate the turning plug of the bleed cock 46 thus bleeding the cylinder and exhausting the air or other suitable fluid entrapped whereupon the spring 43 will return the piston to its normal position and at the same time release the emergency or parking brakes. It will be understood that the embodiment of the invention disclosed in Fig. 3, is particularly adapted for the use of air which enters the cylinder through line 44, and valve 45, and is bled therefrom through the bleed cock 46. Any suitable structure may be formed to provide for the use of other fluids without departure from the spirit of this invention.

It will thus be seen from the foregoing description, that I have provided a vehicle brake structure that will eliminate the use of a hand lever for actuating the emergency or parking brake and by the use of a foot-controlled mechanism of this character, the operator may have complete control of the steering wheel at all times and whenever it becomes necessary to apply the emergency brakes, the same can be instantly brought into an operative position by actuating the foot lever provided therefor and the parts can be reset by simply operating the foot lever that is provided for the service brakes.

A structure of this character can be readily and easily installed on an automobile and will not necessitate any material alterations. Furthermore said operating mechanism will at all times be positive and efficient in carrying out the purposes for which the same is designed.

While I have shown the preferred embodiment of my invention, it is to be understood that minor changes in the size, shape and arrangement of parts may be resorted to without departing from the spirit of the invention or the scope of the appended claims.

What I claim is:

1. In combination with the service and emergency brakes of an automobile including the usual foot lever and the means for connecting the same with the service brakes, foot-controlled means to actuate the emergency brakes, and additional means operated by the foot brake to release the emergency brakes and the actuating means therefor.

2. In combination with the service and emergency brakes of an automobile including the usual foot lever and the means for connecting the same with the service brakes, foot-controlled means to actuate the emergency brakes, said last-mentioned means including a cylinder, means for supporting the same on the frame of an automobile, a piston operable within the cylinder, a plunger rod connected at one end with the piston and being slidable through one end of the cylinder and connected at its other end to the emergency brakes, means for holding the piston in one position in the cylinder, and foot-control means to effect the movement of the piston in the cylinder to actuate the plunger rod and apply the emergency brakes.

3. In combination with the service and emergency brakes of an automobile including the usual foot lever and the mechanism associated therewith for actuating the service brakes, a cylinder rigidly supported on the frame of an automobile, a piston operable within the cylinder, a plunger connected at its forward end to the piston and extending through the rear end of the cylinder, the rear end of the plunger rod being operatively connected with the emergency brakes to actuate the same, means for holding the piston normally in the rear end portion of the cylinder, a foot lever extending through the floor board of the automobile, and means associated with the foot lever for effecting the forward movement of the piston in the cylinder to actuate the plunger rod and apply the emergency brake.

4. In combination with the service and emergency brakes of an automobile including the usual foot lever and the mechanism associated therewith for actuating the service brakes, a cylinder rigidly supported on the frame of an automobile, a piston operable within the cylinder, a plunger connected at its forward end to the piston and extending through the rear end of the cylinder, the rear end of the plunger rod being operatively connected with the emergency brakes to actuate the same, means for holding the piston normally in the rear end portion of the cylinder, a foot lever extending through the floor board of the automobile, and means associated with the foot lever for effecting the forward movement of the piston in the cylinder to actuate the plunger rod and apply the emergency brake, and means for operatively connecting the service brake foot lever with the cylinder to effect the return of the piston to its rearmost position in the cylinder and to release the emergency brakes.

5. In combination with the service and emergency brakes of an automobile including the usual foot lever and the mechanism associated therewith for actuating the service brakes, a cylinder rigidly supported on the frame of an automobile, a piston operable within the cylinder, a plunger connected at its forward end to the piston and extending through the rear end of the cylinder, the rear end of the plunger rod being operatively connected with the emergency brakes to actuate the same, means for holding the piston normally in the rear end portion of the cylinder, a foot lever extending through the floor board of the automobile, and means associated with the foot lever for effecting the forward movement of the piston in the cylinder to actuate the plunger rod and apply the emergency brake, said last-mentioned means including a pivoted dog adapted to project into the side of the cylinder for engagement with the front face of the piston, a link and rod connection between the foot lever and the dog, and an expansible spring arranged within the cylinder encircling the forward end portion of the plunger rod for disposition between the rear face of the piston and the rear end of the cylinder to urge the piston forwardly in said cylinder when the dog is disengaged from the piston.

6. In combination with the service and emergency brakes of an automobile including the usual foot lever and the mechanism associated therewith for actuating the service brakes, a cylinder rigidly supported on the frame of an automobile, a piston operable within the cylinder, a plunger connected at its forward end to the piston and extending through the rear end of the cylinder, the rear end of the plunger rod being operatively connected with the emergency brakes to actuate the same, means for holding the piston normally in the rear end portion of the cylinder, a foot lever extending through the floor board of the automobile, and means associated with the foot lever for effecting the forward movement of the piston in the cylinder to actuate the plunger rod and apply the emergency brake, said last-mentioned means including a pivoted dog adapted to project into the side of the cylinder for engagement with the front face of the piston, a link and rod connection between the foot lever and the dog, and an expansible spring arranged within the cylinder encircling the forward end portion of the plunger rod for disposition between the rear face of the piston and the rear end of the cylinder to urge the piston forwardly in said cylinder when the dog is disengaged from the piston, and a member operatively connected with the service brake foot lever for slidable movement through the forward end of the cylinder to move the piston and the plunger rod rearwardly to release the emergency brakes and to position the piston behind the locking dog as and for the purpose described.

In testimony whereof I affix my signature.

JACK INSUL.